US010454860B2

(12) United States Patent
Mody et al.

(10) Patent No.: US 10,454,860 B2
(45) Date of Patent: Oct. 22, 2019

(54) AUTOMATICALLY CONVERTING MESSAGES INTO A COLLABORATION CONTENT ITEM

(71) Applicant: DROPBOX, INC., San Francisco, CA (US)

(72) Inventors: Viraj Mody, San Francisco, CA (US); Reinier Bezuidenhout, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 259 days.

(21) Appl. No.: 15/283,148

(22) Filed: Sep. 30, 2016

(65) Prior Publication Data

US 2018/0097755 A1 Apr. 5, 2018

(51) Int. Cl.
*H04L 12/58* (2006.01)

(52) U.S. Cl.
CPC .................. *H04L 51/063* (2013.01)

(58) Field of Classification Search
CPC ..... H04L 51/063; H04L 51/04; H04L 65/403; H04L 51/22
See application file for complete search history.

(56) References Cited

U.S. PATENT DOCUMENTS

| | | | | |
|---|---|---|---|---|
| 2007/0016647 A1* | 1/2007 | Gupta | ................. | G06Q 10/107 709/206 |
| 2011/0219083 A1* | 9/2011 | Nishi | ..................... | G06F 15/16 709/206 |
| 2014/0096032 A1* | 4/2014 | Mayblum | .............. | H04L 51/22 715/752 |
| 2014/0280053 A1* | 9/2014 | Derks | .................... | G06Q 10/10 707/722 |
| 2014/0280602 A1* | 9/2014 | Quatrano | ............... | H04L 67/02 709/205 |
| 2015/0135300 A1* | 5/2015 | Ford | .................. | H04L 67/1097 726/11 |
| 2017/0118152 A1* | 4/2017 | Lee, II | ................... | H04L 51/18 |

* cited by examiner

*Primary Examiner* — Brian J. Gillis
*Assistant Examiner* — Chhian (Amy) Ling
(74) *Attorney, Agent, or Firm* — DLA Piper LLP (US)

(57) ABSTRACT

Disclosed are systems, methods, and non-transitory computer-readable storage media for automatically converting messages into a collaboration content item in a content management system. For example, a message conversion module on a computing system can receive a message or message thread addressed to one or more recipients. The message conversion module can generate a collaboration content item, which can be stored in the content management system. The collaboration content item can include the content of the message or message thread. The message conversion module can cause the content management system to share the collaboration content item with collaborators of the message or message thread such that one or more of the collaborators can access the collaboration content item and receive updates when the collaboration content item is modified.

28 Claims, 11 Drawing Sheets

AUTOMATICALLY CONVERTING MESSAGES INTO A COLLABORATION CONTENT ITEM

BACKGROUND

Electronic messaging systems, such as email, instant messaging, text messaging, etc., are often used in business to collaborate on projects and exchange ideas. However, keeping track of individual messages and message threads that contain different ideas, feedback, revisions, and the like can be a daunting task. Moreover, often these ideas need to be consolidated into a single specification or proposal for the project. The task of browsing messages, extracting important ideas or features, and generating a specification or proposal document can be burdensome.

SUMMARY

Additional features and advantages of the disclosure will be set forth in the description which follows, and in part will be apparent from the description, or can be learned by practice of the herein disclosed principles. Various features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically converting messages into a shared content item in a content management system. For example, a message conversion module on a computing device (e.g., a message conversion module of a message processing system) can receive a message or message thread addressed to one or more collaborators. The message conversion module can generate a collaboration content item in the content management system that includes the content of the message or message thread. The message conversion module can cause the content management system to share the content item with recipient and/or sender (e.g., collaborators) of the message or message thread such that all of the collaborators identified (e.g., addressed) in the message or message thread can access the content item and receive updates when the content item is modified.

BRIEF DESCRIPTION OF THE DRAWINGS

The above-recited and other advantages and features of the disclosure will become apparent by reference to specific embodiments thereof which are illustrated in the appended drawings. One skilled in the art will recognize that these drawings depict example embodiments of the disclosure and are not therefore to be considered to be limiting of its scope. The principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a way for users to communicate and collaborate efficiently without the extraneous information and confusion that can accompany traditional electronic messaging technologies. To that end, embodiments described herein provide a mechanism to automatically convert electronic messages (e.g., email messages, chat messages, social media messages, text messages, etc.) into a shared collaboration content item (e.g., electronic document) that simplifies the presentation of message data to the user. The simplified presentation of message data allows the user to focus his or her attention on message content without having to filter through the clutter of additional metadata, such as message address fields, redundant subject lines, and the like. By collaborating and/or communicating through a shared collaboration content item, the user no longer has to keep track of electronic messages in a message client. Further, because collaboration and communication is performed through the shared collaboration content item, the client devices and/or server devices operating the electronic messaging systems no longer have to send, receive, store, and/or manage electronic messages. Thus, by collaborating and communicating through shared collaboration content items, the client device and/or server device resources previously allocated to managing electronic messages can be conserved and/or reassigned to other tasks.

Figure 1:
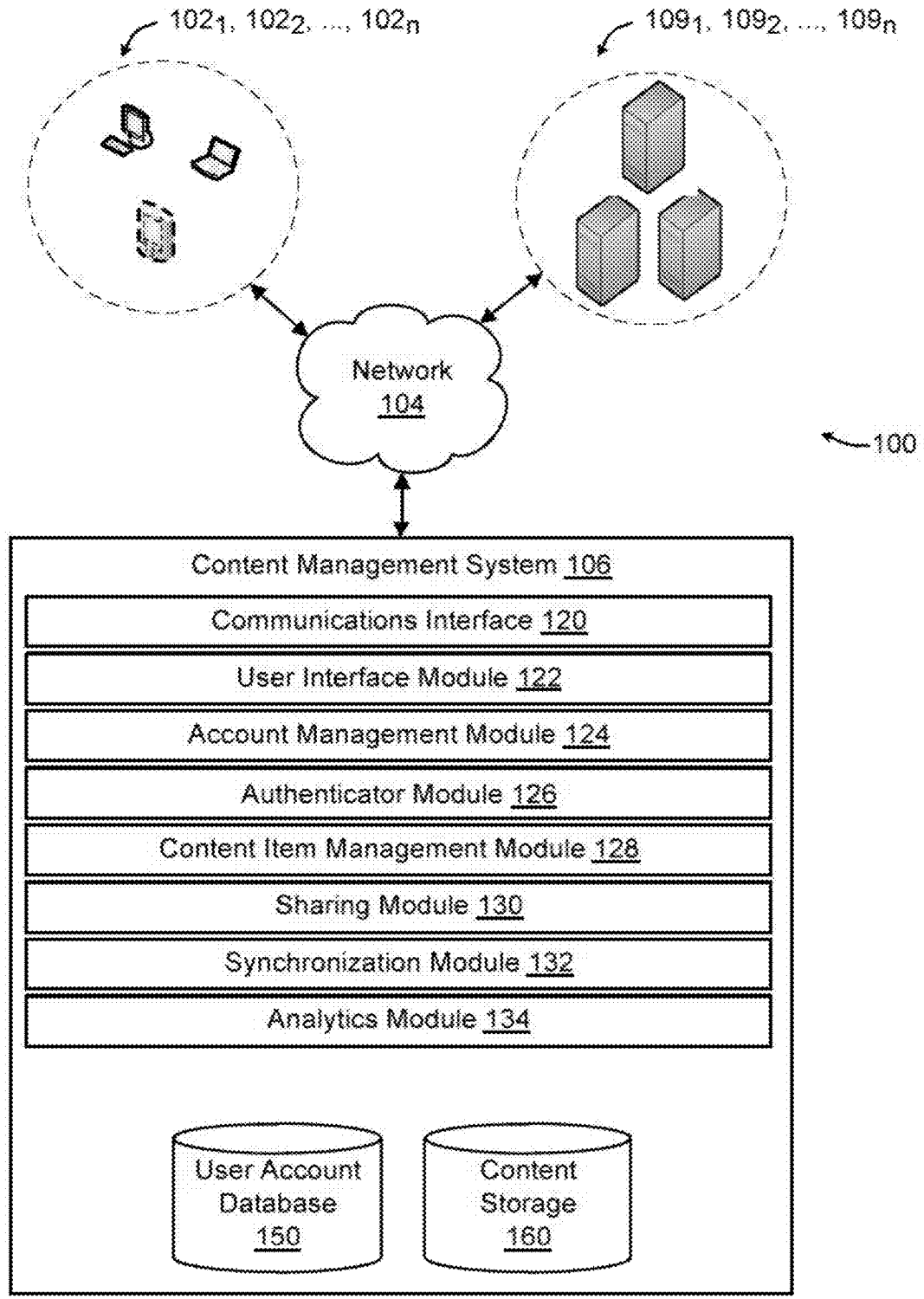
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices 102₁, 102₂, . . . , 102ₙ (collectively "102") connected to network 104 by direct and/or indirect communication. Content management system 106 can include a single computing device (e.g., a server) or multiple computing devices (e.g., multiple servers) that are configured to perform the functions and/or operations that provide the services described herein. Content management system 106 can support connections from a variety of different client devices, such as: desktop computers; mobile computers; mobile communications devices, e.g. mobile phones, smart phones, tablets; wearable devices; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device 102ᵢ. In some embodiments, the client-side application can include a content management system specific component. For example, the content management system specific component can be a stand-alone application, one or more application plug-ins, and/or a browser extension. However, the user can also interact with content management system 106 via a third-party application, such as a web browser, that resides on client device 102ᵢ and is configured to communicate with content management system 106. In various implementations, the client-side application can present a user interface (UI) for a user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access content from multiple client devices 102. For example, client device 102ᵢ can upload content to content management system 106 via network 104. Later, the same client device 102ᵢ or some other client device 102ⱼ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g., various tiers of free or paid accounts), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, image files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102ᵢ. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. Content storage 160 can store the metadata for a content item as part of the content item or separately from the content item. In some variations, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items with one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In some implementations of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content stored in a user account via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides authentication credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content item management module 128 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
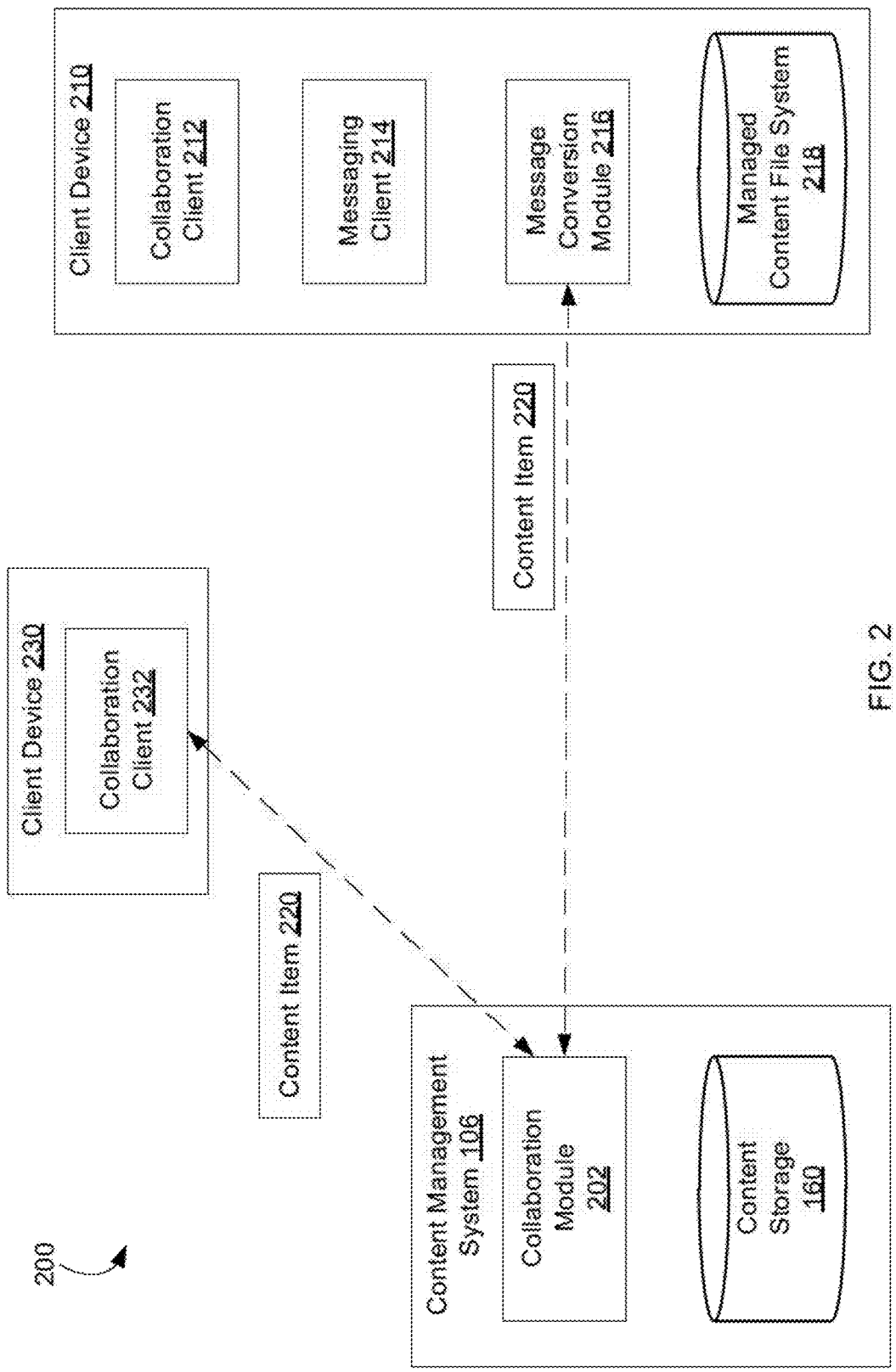
FIG. 2 is a block diagram of an example system for automatically converting messages into a shared content item at a client device.

FIG. 2 is a block diagram of an example system 200 for automatically converting messages into a collaboration content item at a client device. For example, a collaboration content item can be a content item of content management system 106 that has been shared with collaborators (e.g., users, message recipients, message senders, etc.) identified in the message or message thread that is being converted. For example, system 200 can convert messages that originate at client device 210 into collaboration content items. In some implementations, system 200 can include content management system 106, as described above with reference to FIG. 1.

In some implementations, content management system 106 can include collaboration module 202. For example, collaboration module 202 can provide features and functionality that allow various users using different client devices to collaborate on content items. For example, a content item can be a word processing document, a slide show presentation, a web page, or other digital item of content. A content item managed by content management system 106 or collaboration module 202 can have a different format or be of a different type than the electronic messages discussed herein.

In some implementations, collaboration module 202 can be a web server that delivers web pages or web applications to web browsers on client devices. Users can interact with the web pages or web applications to collaborate (e.g., view, edit, comment, etc.) on content items stored in content storage 160. Collaboration module 202 can be a server module that provides APIs. Collaboration client applications running on client devices can interact with the APIs to allow users to collaborate on content items stored in content storage 160. For example, the collaboration client applications can provide user interfaces that allow users to collaborate on content items stored in content storage 160 through collaboration module 202.

In some implementations, system 200 can include client device 210. For example, client device 210 can correspond to client devices 102, of FIG. 1. Client Device 210 can be, for example, a smartphone, a tablet computer, a laptop computer, or any other computing device. Client device 210 can include collaboration client 212. In some implementations, collaboration client 212 can be a web browser that receives web pages or web applications from collaboration module 202. In some implementations, collaboration client 212 can be a native application running on client device 210 that presents graphical user interfaces that a user of client device 210 can interact with to collaborate on content items stored in content storage 160.

In some implementations, collaboration client 212 can present and edit content items stored in managed content file system 218. For example, managed content file system 218 can be a file system managed by content management system 106 such that content items stored in managed content file system 218 are synchronized with content storage 160 in content management system 106. Thus, a user of client device 210 can collaborate on content items with other users by viewing or editing content items stored locally in managed content file system 218 and content management system 106 can synchronize the content items with content storage 160 and/or other client devices (e.g., client device 230) so that other users can view or edit the same content items.

In some implementations, client device 210 can include messaging client 214. In various implementations, messaging client 214 can be a web browser that presents web pages or web applications received from a messaging web server for presenting messages addressed to the user of client device 210 and received at a messaging server. In various implementations, messaging client 214 can be a native client application that presents messages addressed to the user of client device 210 and received from a messaging server. For example, the messages can be electronic messages such as electronic mail, instant messages, text messages, and the like.

In some implementations, client device 210 can include message conversion module 216. For example, message conversion module 216 can be part of messaging client 214. For example, message conversion module 216 can be a web browser extension, a web browser plugin, a software module of a native messaging client, etc. Message conversion module 216 can be a standalone software module (e.g., utility, operating system function, etc.).

In some implementations, message conversion module 216 can convert electronic messages into collaboration content items. For example, a collaboration content item can be a content item that is shared among multiple collaborators. For example, message conversion module 216 can convert electronic messages received by messaging client 214 into collaboration content items managed by content management system 106, and/or collaboration module 202. For example, a user of client device 210 can interact with messaging client 214 to compose or view an electronic message (e.g., email, chat message, instant message, social media post, comment, etc.) or message thread (e.g., a group of related messages). The user can select a graphical element (e.g., a button) presented by messaging client 214 to cause messaging client to invoke message conversion module 216. In response to the selection of the graphical element, messaging client 214 can send the message or message thread to message conversion module 216 and message conversion module 216 can convert the electronic message into a collaboration content item (e.g., content item 220). Message conversion module 216 can, for example, send content item 220 to collaboration module 202 for storage in content storage 160. Message conversion module 216 can store content item 220 in managed content file system 218 so that content item 220 can be synchronized with content storage 160 by content management system 106.

In some implementations, message conversion module 216 can cause content management system 106 to share content item 220 with collaborators (e.g., recipients or senders) identified in the corresponding electronic message or message thread. For example, message conversion module 216 can store content item 220 in the content management system account associated with the user of client device 210 (e.g., the user that initiated the message conversion). Message conversion module 216 can parse address information from the electronic message to determine collaborator identifiers (e.g., email address, telephone number, user identifier, etc.) based on the electronic message or message thread. Message conversion module 216 can then cause content management system 106 to share content item 220 with the identified collaborators. For example, message conversion module 216 can invoke an API or function of content management system 106 for specifying sharing parameters, permissions, etc., for a collaboration content item managed by content management system 106.

After content item 220 has been shared with the collaborators identified in the message or message thread, content item 220 can be accessed by the collaborators from other devices. For example, a user (e.g., collaborator) of client device 230 can use collaboration client 232 on client device 230 to access and/or collaborate on (e.g., edit, comment on, view, etc.) content item 220 through collaboration module 202 in content management system 106. In some implementations, content management system 106 can synchronize the shared content item 220 with client device 230 so that the user of client device 230 can interact with or collaborate on a local copy of content item 220 stored on client device 230.

In some implementations, content management system 106 can cause client device 210 and/or client device 230 to present graphical notifications when changes to the collaboration content item 220 occur. For example, when the user of client device 230 edits content item 220, content management system 106 can detect the change to content item 220 and cause client device 210 to present a graphical notification indicating a change to content item 220 has been made. The graphical notification can also indicate which user made the change. Thus, even though some of the collaborating users are not using electronic messaging to exchange ideas, users with whom content item 220 has been shared can still receive real time or near real time notifications of updates, changes, comments, etc., made with respect to shared content item 220.

Figure 3:
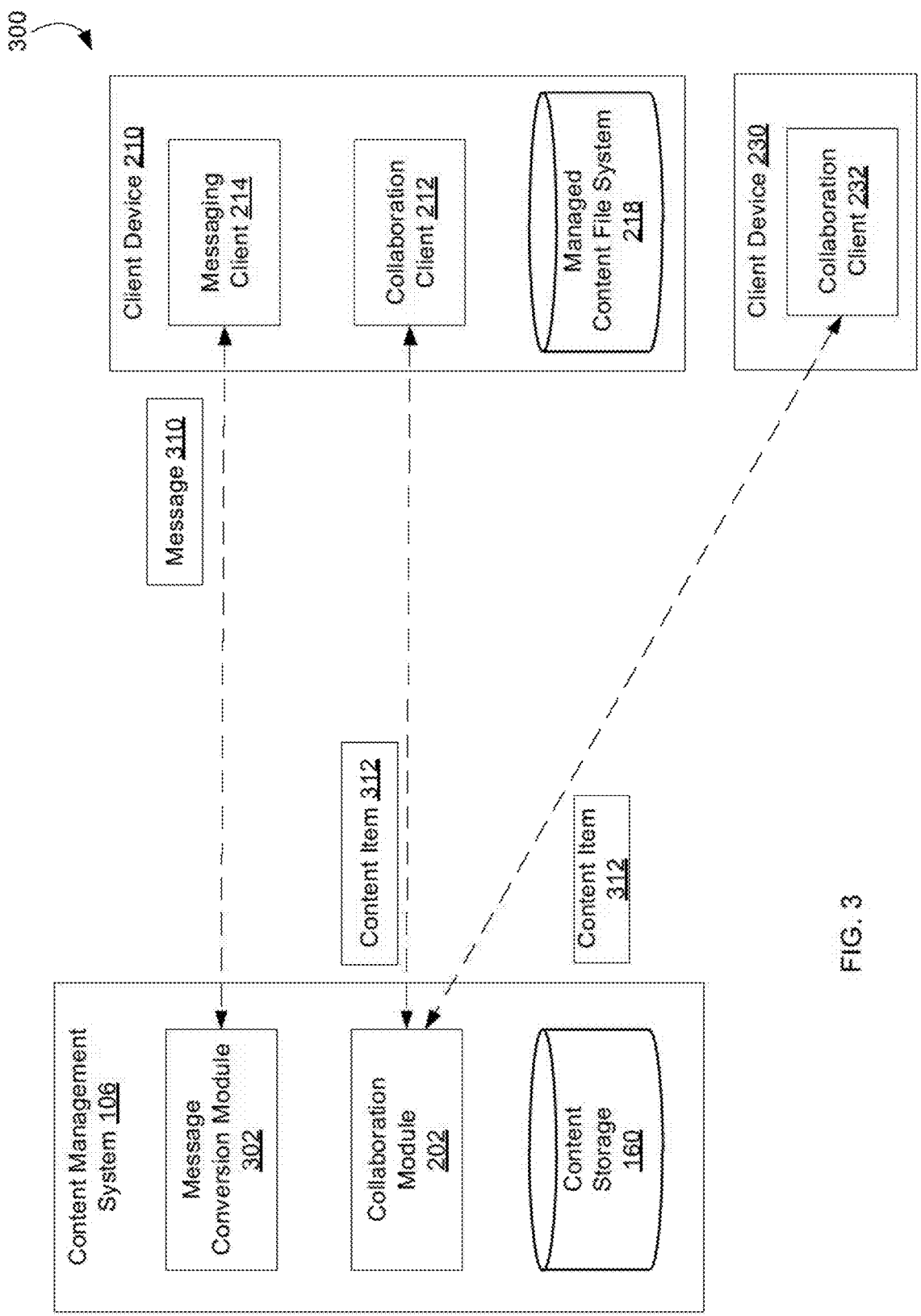
FIG. 3 is a block diagram of an example system for automatically converting messages into a shared content item at a content management system server.

FIG. 3 is a block diagram of an example system 300 for automatically converting messages into a collaboration content item at a content management system server. For example, instead of converting messages into collaboration content items at client device 210, messaging client 214 can send the selected message or message thread to message conversion module 302 on content management system 106. Message conversion module 302 can convert the message or message thread into a collaboration content item that content management system 106 can manage. For example, message conversion module 302 can have similar functions and features for identifying collaborators and converting messages into collaboration content items as message conversion module 216 of FIG. 2. However, while message conversion module 216 runs on client device 210, message conversion module 302 runs on a server device of content management system 106.

As described above, messaging client 214 can receive an electronic message or message thread. For example, a message thread can be a plurality of related messages. The messages in message thread can be related by topic (e.g., subject), for example. The user of client device 210 can select a graphical element (e.g., a button) on a user interface of messaging client 214 to convert the electronic message or message thread to a collaboration content item. For example, the user can compose a message on client device 210 can cause client device 210 convert the message into a collaboration content item. The user can receive the message on client device 210 and cause client device 210 convert the message into a collaboration content item. In response to receiving the selection, messaging client 214 can send the electronic message or message thread (e.g., message 310) to message conversion module 302 on content management system 106. For example, messaging client 214 can forward the message 310 to an email address, telephone number, or some other identifier for message conversion module 302 using known electronic messaging protocols. Alternatively, messaging client 214 can invoke a client-server API of message conversion module 302 to send message 310 (e.g., an electronic message or message thread) to message conversion module 302.

In some implementations, content management system 106 can initiate the message conversion automatically. For example, content management system 106 can intercept an electronic message or message thread. Content management system 106 can, for example, be running on a server (e.g., proxy server, intermediate server, edge server, etc.) that processes electronic messages. Content management system 106 can intercept a message or message thread sent to, or received from, a user of content management system 106 and send the intercepted message or message thread to message conversion module 302.

In response to receiving message 310, message conversion module 302 can convert message 310 into a collaboration content item (e.g., content item 312) and store the collaboration content item in content storage 160. Additionally and as described above, message conversion module 302 can cause content management system 106 to share content item 312 with collaborators identified in message 310. For example, message conversion module 302 can parse message 310 to determine user identifiers for recipients and senders of messages in the message or message thread included in message 310. Message conversion module 302 can then invoke a content item sharing API of content management system 106 and provide the collaborator identifiers to content management system 106 to cause content management system 106 to share content item 312 with the users corresponding to the collaborator identifiers. For example, when content item 312 is shared with the user of client device 210 and/or client device 230, content management system 106 can synchronize content item 312 with client device 210 and/or client device 230 so that the associated users can access and/or collaborate on a local copy of content item 312 using respective collaboration clients 212 and 232. Alternatively, the user of client device 210 (or client device 230) can collaborate on content item 312 by accessing content item 312 stored in content storage 160 through collaboration module 202 and collaboration client 212 (or collaboration client 232).

Figure 4:
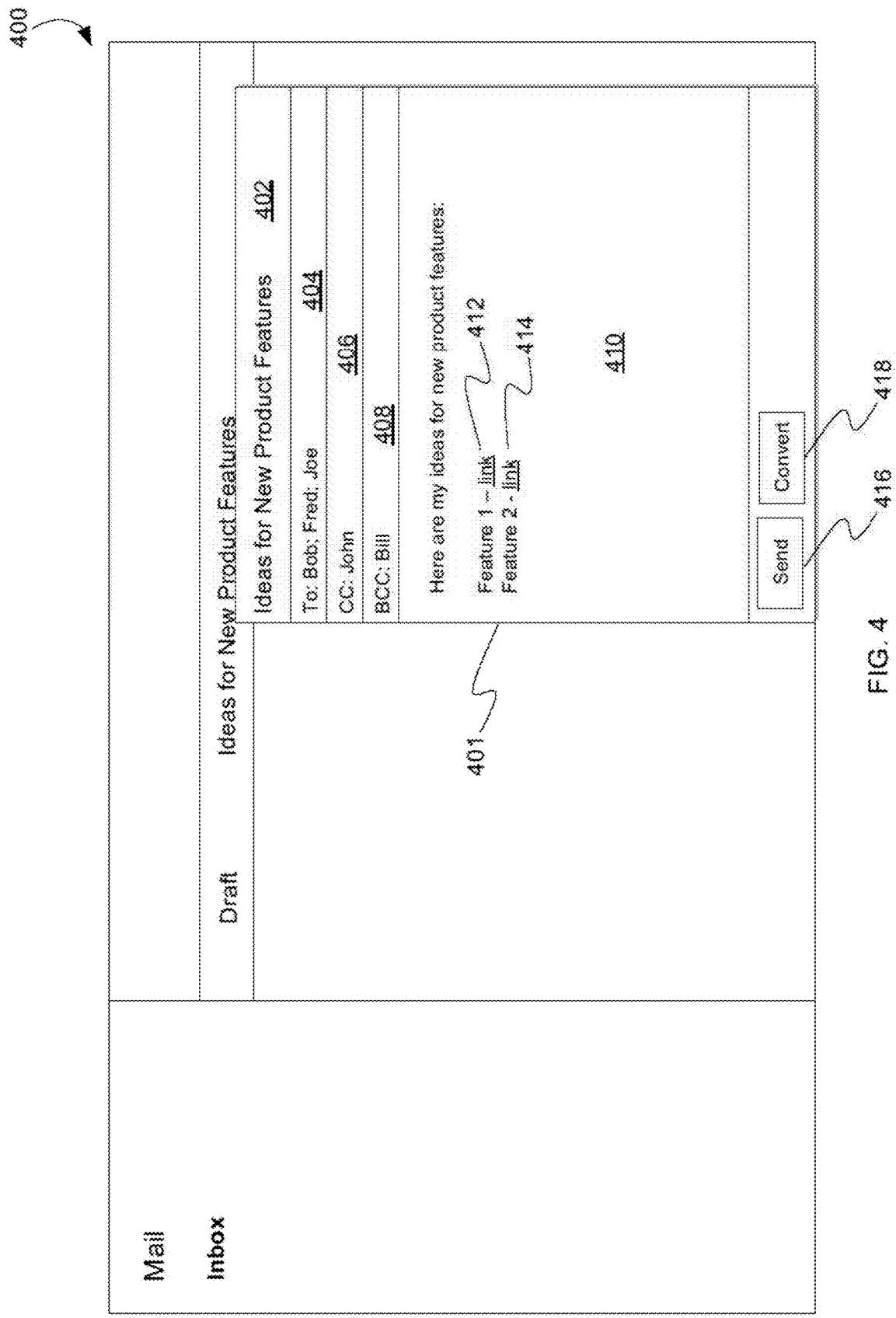
FIG. 4 illustrates an example graphical user interface for initiating a conversion of a message to a content item.

FIG. 4 illustrates an example graphical user interface 400 for initiating a conversion of a message to a collaboration content item. For example, graphical user interface (GUI) 400 can be a graphical user interface presented by messaging client 214 for viewing, composing, and/or editing electronic messages. For simplicity, the description that follows will describe features and processes for converting electronic messages into collaboration content items with reference to electronic mail (email) messages. However, implementations described herein can also be used to convert other electronic messages, such as instant messages, text messages, chat messages, social media posts, and the like to collaboration content items.

In some implementations, GUI 400 can present a representation of an email message 401. For example, a user of client device 210 can interact with GUI 400 of messaging client 214 to compose email message 401. Email message 401 can include, for example, a subject field 402 including a string representing the subject of email message 401. Email message 401 can identify collaborators (e.g., sender, recipient, etc.) on the topic discussed in email message 401. For example, email message 401 can include a "to" field 404 including the addresses of or identifiers for recipient users to whom email message 401 is addressed. Email message 401 can include a "CC" (e.g., carbon copy) field 406 including the addresses of or identifiers for recipient users to whom email message 401 is copied. Email message 401 can include a "BCC" (e.g., blind carbon copy) field 408 including the addresses of or identifiers for recipient users to whom email message 401 is secretly copied. Each of the items 402, 404, 406, and 408 can be included in the header of the email message.

In some implementations, email message 401 can include message body 410. For example, message body 410 can include text, links (e.g., hyperlinks, uniform resource locators, etc.) to content, embedded media items, and/or other content. For example, message body 410 can include links 412 and/or 414 to media items from a network resource (e.g., the Internet) or content items managed by content management system 106. The user of client device 210 can send the email to the recipients listed in fields 404, 406, and/or 408, by actuating the graphical element 416 (e.g., a button).

In some implementations, GUI 400 can include graphical element 418 for converting email message 401 into a collaboration content item managed by content management system 106. For example, a user can select graphical element 418 to invoke message conversion module 216 on client device 210. Alternatively, a user can select graphical element 418 to cause messaging client 214 to send email message 401 to message conversion module 302 running on a server device of content management system 106, as described above. To improve readability and comprehension of the implementations described herein, the following description will describe email conversion features with reference to message conversion module 216. However, message conversion module 302 can perform similar operations and provide similar features as message conversion module 216.

Figure 5:
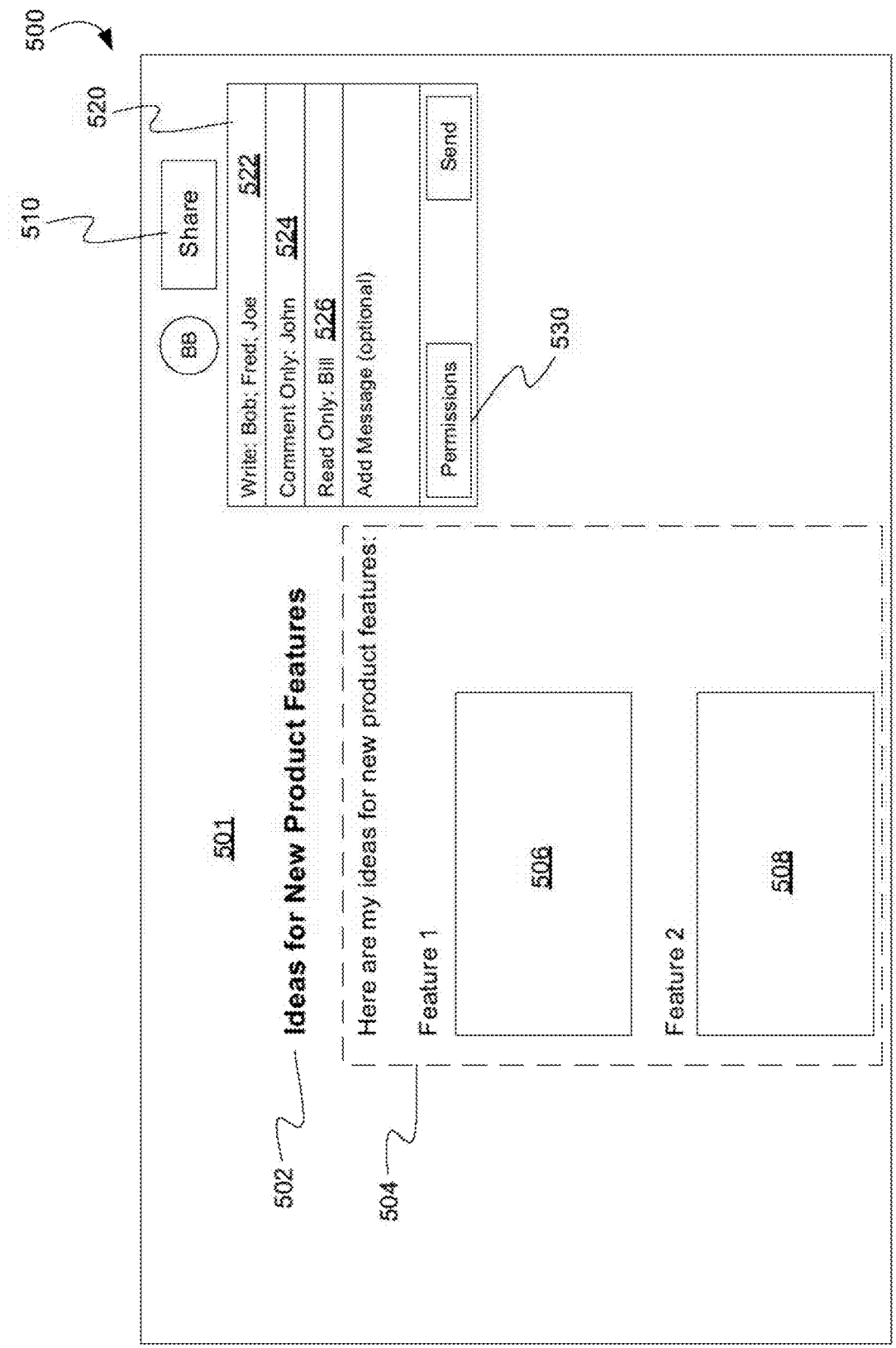
FIG. 5 illustrates an example graphical user interface for presenting a content item corresponding to a converted email message.

FIG. 5 illustrates an example graphical user interface 500 for presenting a collaboration content item corresponding to a converted email message. GUI 500 can be a graphical user interface presented by collaboration client 212, described above with reference to FIG. 2 and FIG. 3. For example, GUI 500 can present content item 501 (e.g., a collaboration content item) after content item 501 is generated from (e.g., based on) email message 401 in response to the user selecting graphical element 418, as described above. For example, content item 501 can be a word processing document, web page, multimedia presentation, or other type of content item that is created using content from email message 401.

In some implementations, content item 501 can include title 502. For example, message conversion module 216 can parse the header of email message 401 to obtain subject 402 (e.g., a line of text, a string, etc.). Once subject 402 is obtained, message conversion module 216 can insert subject 402 into content item 501 as the title 502 of content item 501. Message conversion module 216 can parse the header of email message 401 to obtain "to" field 404, "CC" field 406, and/or "BCC" field 408. However, message conversion module can exclude field 404, field 406, and field 408 from content item 501. By excluding the "to" field 404, "CC" field 406, and/or "BCC" field 408 from content item 501, message conversion module 216 can generate a content item that has less clutter, is focused on important content, and is easier to read and comprehend.

In some implementations, content item 501 can include content 504. For example, message conversion module 216 can parse email message 401 to obtain email message body 410. Once email message body 410 is obtained, message conversion module 216 can insert email message body 410 into content item 501 as content 504 of content item 501. If message body 410 includes links to external media items, web pages, or other content items managed by content management system 106, message conversion module 216 can convert the links into embedded content items 506 and/or 508 in content item 501. For example, message conversion module 216 can convert link 412 into embedded item 506 by using the link (e.g. the URL) to locate and obtain the external content item identified by the link and embedding the external content item into content item 501.

In some implementations, content item 501 can be shared with collaborators (e.g., sender and/or recipients) of email message 401. For example, message conversion module 216 can cause content item 501 to be stored in a user account in content management system 106 associated with the user (e.g., the user of client device 210, the user who composed email message 401, etc.) who initiated the conversion of email message 401 to content item 501. Message conversion module 216 can cause content item 501 to be shared by content management system 106 with the collaborators identified in email message 401. For example, after message conversion module 216 parses the header of email message 401 to obtain "from" field, "to" field 404, "CC" field 406, and/or "BCC" field 408 to obtain collaborator identification information, message conversion module 216 can cause content management system 106 to share content item 501 with the identified collaborators.

In some implementations, permissions can be assigned to collaborators based on how the collaborators are addressed in email message 401. For example and as illustrated by graphical element 520, collaborators addressed in the "to" field 404 of email message 401 can be automatically granted write or edit permissions 522 for content item 501. Collaborators addressed in the "CC" field 406 can be automatically granted "comment only" permissions 522 for content item 501. For example, "comment only" permissions may allow a collaborator to read and comment on content item 501 but not edit content 504 of content item 501. Collaborators addressed in the "BCC" field 406 can be automatically granted "read only" permissions 522 for content item 501. For example, "read only" permissions may allow a collaborator to read but not actively collaborate (e.g., edit, comment, etc.) on content item 501. If the user wishes to change the automatically generated permissions, the user can select graphical element 510 (e.g., a button) to invoke graphical element 520 (e.g., a permissions GUI). Graphical element 520 can present the automatically generated permission assignments 522, 524, and/or 526. The user can select graphical element 530 to change the permissions assigned to each collaborator.

Figure 6:
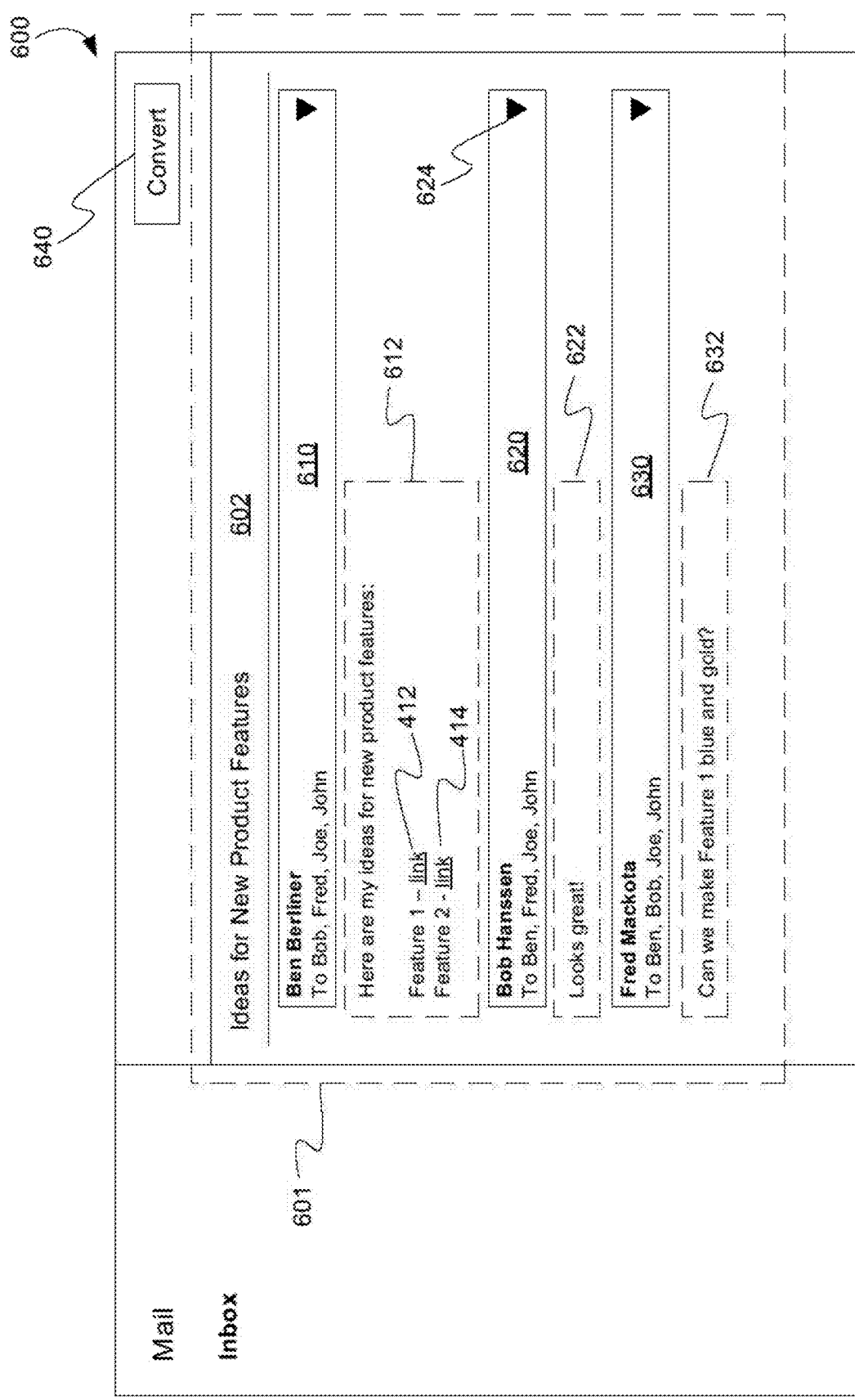
FIG. 6 illustrates an example graphical user interface for presenting an email message thread.

FIG. 6 illustrates an example graphical user interface 600 for presenting an email message thread. For example, GUI 600 can be a graphical user interface of messaging client 214 that presents email received by messaging client 214. In FIG. 6, GUI 600 presents an email message thread, which can be a series, sequence, or grouping of email messages and responses to email messages generated or sent by various collaborators identified in the email message thread by name, email address, or other user identifier. For example, these users (e.g., recipients, senders, collaborators, etc.) can be identified in the "from", "to", "CC", and/or "BCC" fields of an email message header.

In some implementations, GUI 600 can present email message thread 601. Email message thread 601 can include subject field 602 that includes a string that defines the subject or topic of the message thread. Email message thread 601 can include one or more email messages delineated by email message headers 610, 620, and/or 630. As described above, message headers 610, 620, and/or 630 can include collaborator identifiers (e.g., email addresses, user names, etc.) that identify the sender and recipients of each respective email message. For example, email message header 610 indicates that the corresponding email message 612 (e.g., message body 612) was sent from Ben Berliner to Bob, Fred, Joe, and John. The example of FIG. 6 presents email messages in a top down chronological order (e.g., oldest to newest) such that the original or initial email message is at the top and subsequent email messages (e.g., reply emails) are below the original email message. However, GUI 600 can also present a bottoms up chronological order to present email messages in an email message thread. For example, the subsequent email message 622 (e.g., message body 622) can represent a reply to email message 612 from Bob Hanssen to Ben, Fred, Joe, and John. Email message 630 (e.g., message body 630) can represent a reply to email message 612 from Fred Mackota to Ben, Bob, Joe, and John.

In some implementations, GUI 600 can include graphical element 624 for minimizing an email message in a message thread. For example, some email messages in a message thread may contain content or comments that are not important for the conversation conducted in the email message thread. To conserve screen space and/or reduce the amount of information the user is required to process, a user can select graphical element 624 to minimize or hide the corresponding email message 622 so that email message 622 is no longer presented on GUI 600.

In some implementations, GUI 600 can present graphical element 640 to convert email message thread 601 into a collaboration content item in content management system 106. For example, the user can select graphical element 640 to invoke message conversion module 216 to convert message thread 601 into a collaboration content item managed by content management system 106. Upon receiving the selection of graphical element 640, for example, messaging client 214 can send email message thread 601 to message conversion module 216. Messaging client 214 can also send information describing which email messages in the message thread have been minimized or hidden by the user.

Figure 7:
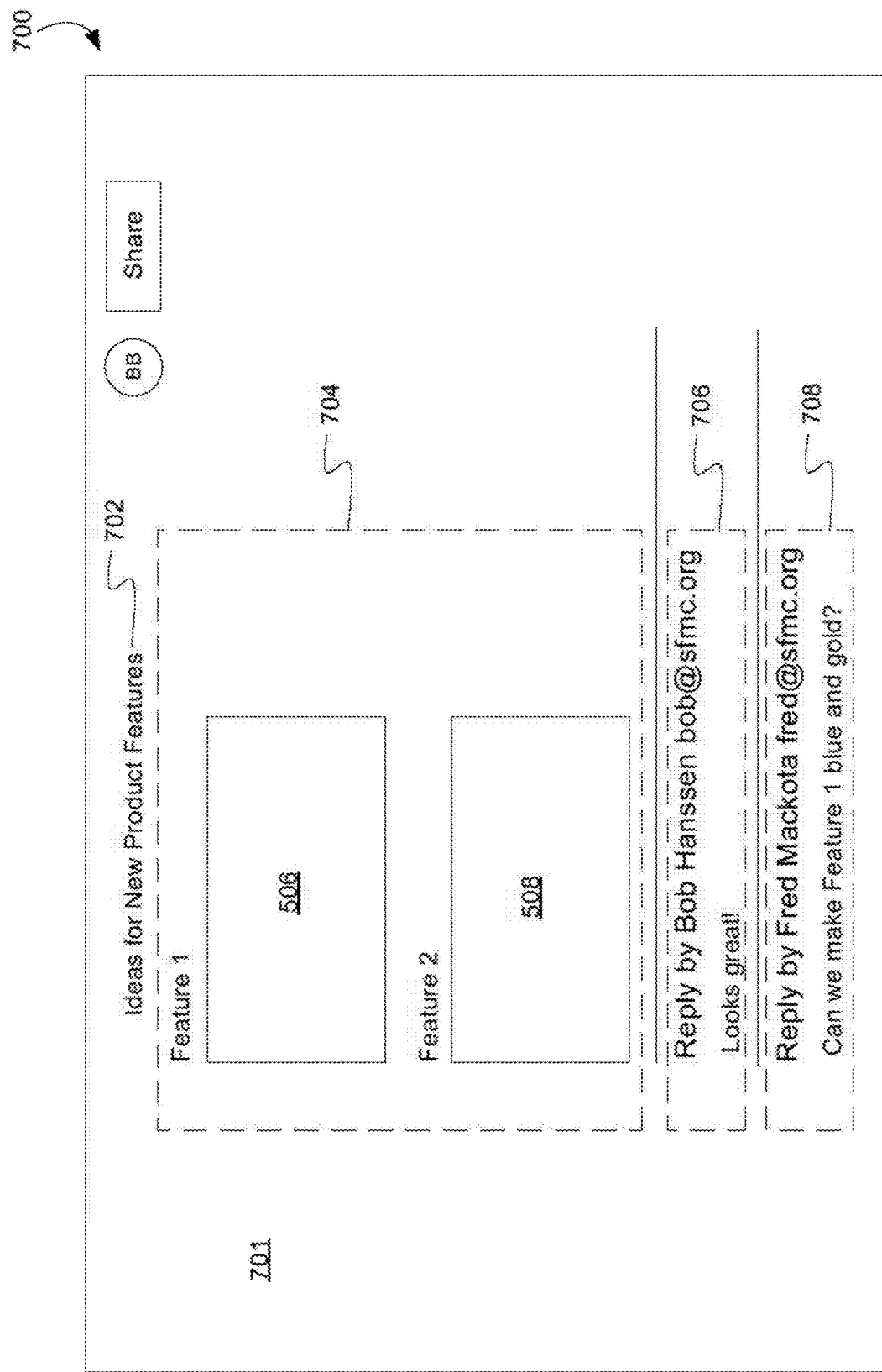
FIG. 7 illustrates a graphical user interface for presenting a shared content item generated from an email message thread.

FIG. 7 illustrates a graphical user interface 700 for presenting a collaboration content item generated from an email message thread. For example, in response to the user selecting graphical element 640 of FIG. 6, message conversion module 216 can generate collaboration content item 701 from email message thread 601. As described above with reference to FIG. 4, the content management system can automatically share collaboration content item 602 with collaborators and assign sharing permissions based on how the collaborators were addressed (e.g., "to", "CC", "BCC", etc.) in the email messages in email message thread 601.

In some implementations, content item 701 can include title 702. For example, message conversion module 216 can determine title 702 based on subject field 602 of email message thread 601 and insert title 702 into content item 701.

In some implementations, content item 701 can include content 704, 706, and/or 708 corresponding to email messages 612, 622, and/or 632, respectively. For example, message conversion module 216 can parse each message in message thread 601 to determine content 704, 706, and/or 708. For example, content 704 can correspond to message body 612. Content 706 can correspond to message body 622. Content 708 can correspond to message body 632. Message conversion module 216 can present or insert content 704, 706, and/or 708 into content item 701 in the same order as email messages 612, 622, and/or 632 appear in message thread 601. However, when generating content 704, 706, and/or 708, message conversion module 216 can remove the collaborator information for each corresponding email message such that only the "from" attribution information remains for content 704, 706, and/or 708. For example, since Bob Hanssen sent the reply email message 622, message conversion module 216 can add attribution information indicating that Bob Hanssen wrote the message "Looks great!" to content 706.

In some implementations, message conversion module 216 can exclude an email message when converting email message thread 601 to shared content item 701. For example, when a user minimizes an email message, message conversion module 216 can exclude the email message from the resulting collaboration content item. Thus, if the user has minimized email message 622, message conversion module 216 can exclude corresponding content 706 from shared content item 701.

In some implementations, message conversion module 216 can automatically exclude an email message when converting email message thread 601 to collaboration content item 701. For example, message conversion module 216 can maintain a blacklist of phrases or strings. When message conversion module 216 detects that a string in a reply email message matches (e.g., corresponds) to a string in the blacklist, message conversion module 216 can automatically exclude the reply email message from content item 701. In some implementations, strings can be added to the blacklist based on user behavior. For example, if a user consistently minimizes email messages having the string "Looks great!", the string "Looks great!" can be added to the blacklist and automatically excluded when converting email message threads to collaboration content items.

Figure 8:
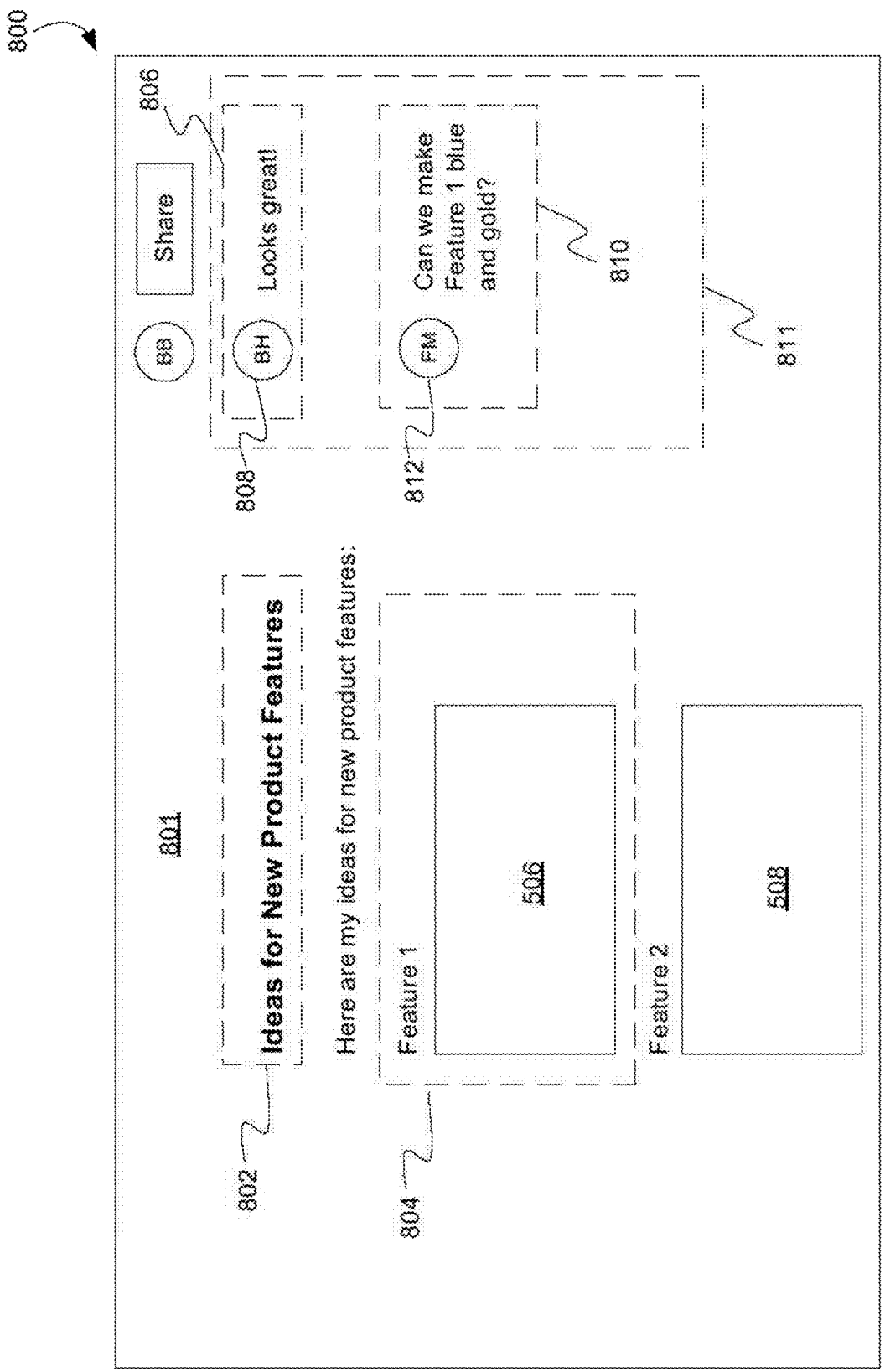
FIG. 8 illustrates an example graphical user interface for presenting a shared content item having comments generated from reply messages in an email message thread.

FIG. 8 illustrates an example graphical user interface 800 for presenting a collaboration content item having comments generated from reply messages in an email message thread. For example, GUI 800 can be a graphical user interface of collaboration client 212 that presents a collaboration content item 801 generated by message conversion module 216 from email message thread 601, as described above. Collaboration content item 801 can be generated by message conversion module 216 similarly to collaboration content item 701 described above. However, instead of including reply email messages as content in content item 801, message conversion module 216 can use reply email messages to generate comments on the content of shared content item 801.

In some implementations, message conversion module 216 can generate shared content item 801 based on message thread 601. For example, message conversion module 216 can parse message thread 601 to determine the initial or original message 612 sent from Ben Berliner in message thread 601. Message conversion module 216 can then generate collaboration content item 801 based on initial message 612.

In some implementations, message conversion module 612 can generate comments for content item 801 based on reply messages 622 and/or 632 in message thread 601. For example, message conversion module 216 can parse message thread 601 to determine reply messages 622 and 632 sent from Bob Hanssen and Fred Mackota respectively in message thread 601. Message conversion module 216 can then generate comments 806 and/or 810 for shared content item 801 based on reply messages 622 and 632, respectively. For example, comments 806 and/or 810 can be presented in comment area 811 (e.g., side bar) adjacent to content item 801. Comments 806 and/or 810 can include attribution information (e.g., graphical elements 808 and/or 812) indicating which user generated the message that message conversion module 216 converted into the corresponding comment.

In some implementations, a comment can be associated with a particular portion of or particular content in content item 801. For example, message conversion module 216 can analyze comment 806 and determine that comment 806 is a general comment about content item 801. Thus, comment 806 can be associated with the entire content item 801 or the subject or title 802 of content item 801. When the user selects comment 806, title 802 can be highlighted on GUI 800 to indicate that comment 806 refers to the entire content item 801.

In some implementations, message conversion module 216 can determine that comment 810 refers to a particular portion of content item 801. For example, message conversion module 216 can perform a string comparison between comment 810 and content item 801 to determine that comment 810 includes a string (e.g., "Feature 1") that is also in content item 801. For example, the string comparison (e.g., matching) can include matching strings over a certain length, matching strings that have one or more keywords related to the topic of content item 801, matching nouns related to people and/or objects described in content item 801. When message conversion module 216 determines that comment 810 refers to content 804 in content item 801, message conversion module 216 can associate comment 810 with content 804. For example, when a user selects comment 810, content 804 in content item 801 can be highlighted to indicate that comment 810 refers to content 804. For example, GUI 800 can highlight content 804 by presenting similar background colors for comment 810 and content 804. GUI 800 can highlight content 804 by drawing a line between comment 810 and content 804.

In some implementations, message conversion module 216 can replace text in comments with graphical representations of emotion. For example, message conversion module 216 can detect the phrase "Looks great!" and replace the text "Looks great!" with a graphic, sticker, icon, emoticon, etc., representing the sentiment or emotion conveyed by the phrase. For example, message conversion module 216 can maintain a mapping of phrases (e.g., strings) to emotional graphics. When message conversion module 216 detects a phrase in a comment that corresponds to an emotional graphic in the mapping, message conversion module 216 can replace the phrase with the corresponding emotional graphic in the mapping.

In some implementations, message conversion module 216 and/or collaboration client 212 can suggest a meeting based on the volume of comments on a content item. For example, a large number of comments (e.g., exceeding a threshold value) can indicate a conflict between collaborators who are working on content item 801. When message conversion module 216 and/or collaboration client 212 detects a number of comments (or a number of comments identified as conflicting based on identified sentiments) that exceed a threshold number, message conversion module 216 and/or collaboration client 212 can send a notification to each of the collaborators (or just the commenting collaborators) suggesting that the collaborators meet in person to discuss content item 801. In some implementations, message conversion module 216 and/or collaboration client 212 can suggest a meeting time and place based on the calendars of the respective collaborators. For example, message conversion module 216 and/or collaboration client 212 can access the collaborator's calendars to determine when each collaborator has free time to discuss content item 801.

In some implementations, message conversion module 216 and/or collaboration client 212 can suggest a collaborator with whom to share content item 801. For example, if a collaborator (e.g. user) Ben Berliner typically (e.g., historically) works with Bob, Fred, John, and Bill, but content item 801 is only shared with Bob, Fred, and John, message conversion module 216 and/or collaboration client 212 can present a notification or prompt to Ben suggesting content item 801 be shared will Bill. Ben can then provide input (e.g., select graphical element 510) to share content item 801 with Bill.

Figure 9:
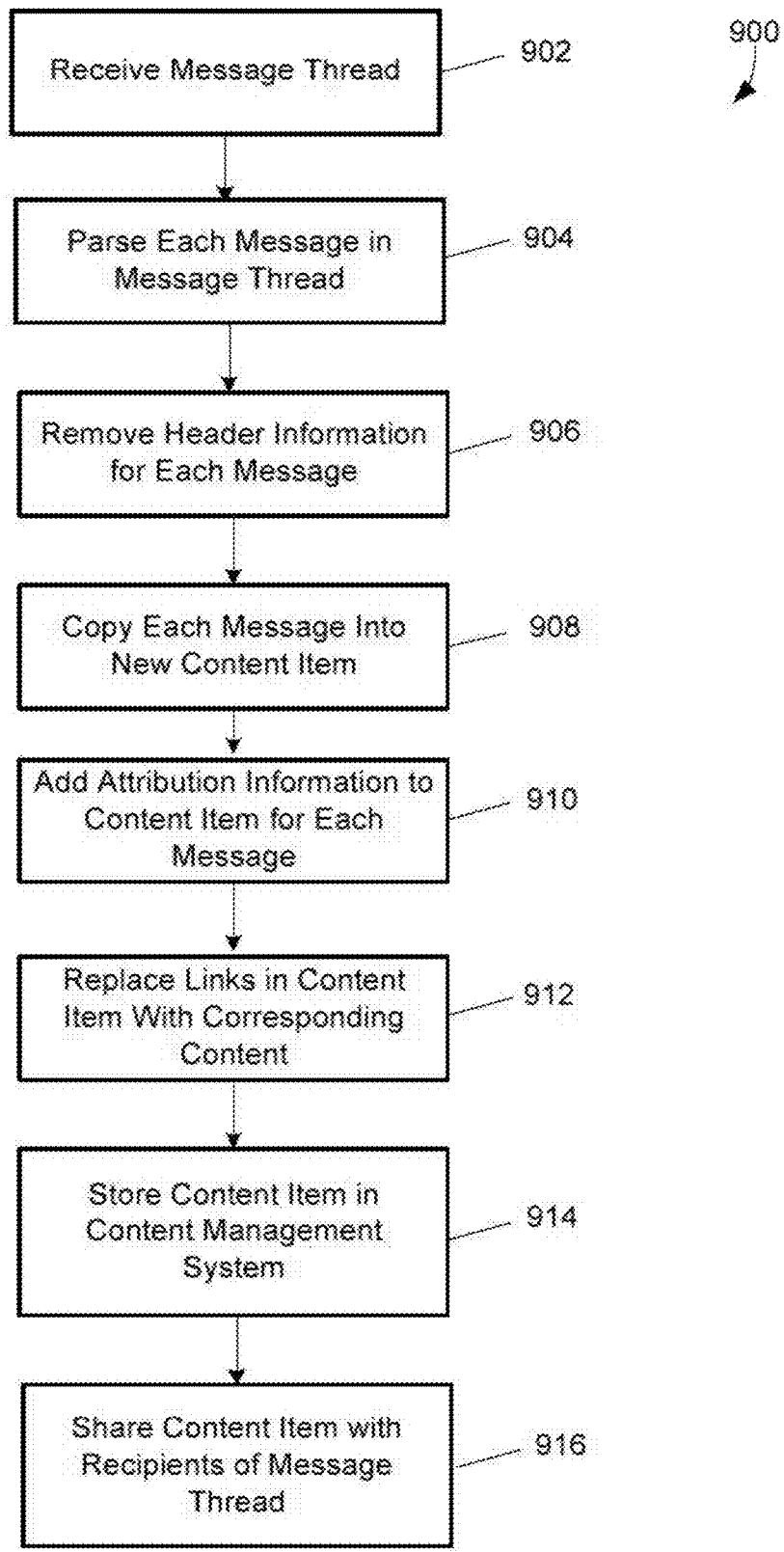
FIG. 9 is a flow diagram representing an example process for automatically converting messages into a shared content item in a content management system.

FIG. 9 is a flow diagram representing an example process 900 for automatically converting messages into a collaboration content item in a content management system. For example, process 900 can be implemented by message conversion module 216 and/or message conversion module 302, as described above. To simplify the description that follows, the steps of process 900 will be described with reference to message conversion module 216. However, message conversion module 302 can perform the same or similar steps to convert electronic messages and/or message threads to shared content items in content management system 106. For example, process 900 can be performed on a message thread that includes a single electronic message or multiple electronic messages (e.g., an initial message and reply messages).

At step 902, message conversion module 216 can receive a message thread. For example, a message thread can include one or more related messages generated by one or more collaborators (e.g., message recipients, message senders, message originators, etc.). Message conversion module 216 can receive the message thread from messaging client 214 on client device 210 in response to receiving user input indicating that the user wishes to convert the message thread into a shared content item. When message conversion module 302 is performing process 900, message conversion module 302 can receive the message thread from client device 210 or message conversion module 302 can receive an intercepted message thread from content management system 106.

At step 904, message conversion module 216 can parse each message in the message thread to identify a variety of information, such as one or more attributes. For example, message conversion module 216 can parse each message in the message thread to determine message header information (e.g., "subject", "from", "to", etc.), identify message contributors (e.g. senders, recipients, commenters), message body information, attachment information (e.g. size, type, content in the attachment, source, etc.), or context information (e.g. time, date, semantic identifiers, source, encoding, etc.).

At step 906, message conversion module 216 can remove header information for each message. For example, message conversion module 216 can remove or exclude "to," "CC," and "BCC" information from the message when converting the message into a collaboration content item. Message conversion module 216 can remove or exclude date information (e.g., date sent). Message conversion module 216 can remove or exclude subject field information, such as subject prefixes (e.g., "re:", "fw:", etc.).

At step 908, message conversion module 216 can copy each message into a new collaboration content item. For example, message conversion module 216 can copy each message in a message thread into the same collaboration content item. For example, message conversion module 216 can copy the "subject" information from the message header into the collaboration content item or can name the collaboration content item using the subject information. Message conversion module 216 can copy the message body into the collaboration content item. In some implementations, message conversion module 216 can add reply messages in the message thread as content in the collaboration content item, as described above. In some implementations, message conversion module 216 can add reply messages as comments to the collaboration content item, as described above.

At step 910, message conversion module 216 can add attribution information to the collaboration content item for each message. For example, message conversion module 216 can determine which user sent each message in the message thread and add attribution information to the collaboration content item identifying the respective user's contribution (e.g., content or comment).

At step 912, message conversion module 216 can determine whether the collaboration content item contains links and replace links in the collaboration content item with corresponding content. For example, when an electronic message includes links to external content (e.g., internet content, network content, other content items managed by content management system 106, etc.), message conversion module 216 can use the links (e.g., URLs) to obtain the content identified by the links and embed the external content in the collaboration content item. In some implementations, the content embedded in the collaboration content item can be a thumbnail or other preview of a collaboration content item at a location where the link points. Thus, the user can view a version of the external content without having to navigate away from the collaboration content item.

At step 914, message conversion module 216 can store the collaboration content item in content management system 106. For example, message conversion module 216 can store the newly created collaboration content item in managed content file system 218 so that the collaboration content item is synchronized with content storage 160 and/or other client devices (e.g., client device 230) by content management system 106. When message conversion module 302 performs the conversion, message conversion module 302 can store the new collaboration content item in content storage 160 and content management system 106 can synchronize (e.g., distribute) the new collaboration content item to other client devices (e.g., client device 210, client device 230, etc.).

At step 916, message conversion module 216 can share the collaboration content item with collaborators of the message thread. For example, message conversion module 216 can analyze the header information (e.g., "From" field, "To" field, "CC" field, "BCC" field, etc.) to determine which users are identified in the message thread. Message conversion module 216 can also analyze other data associated with the thread such as packet headers, user accounts mapped to identified addresses, or active sessions, to identify thread collaborators. Message conversion module 216 can then cause content management system 106 to share the newly created collaboration content item with the identified collaborators, as described above.

Figure 10A:
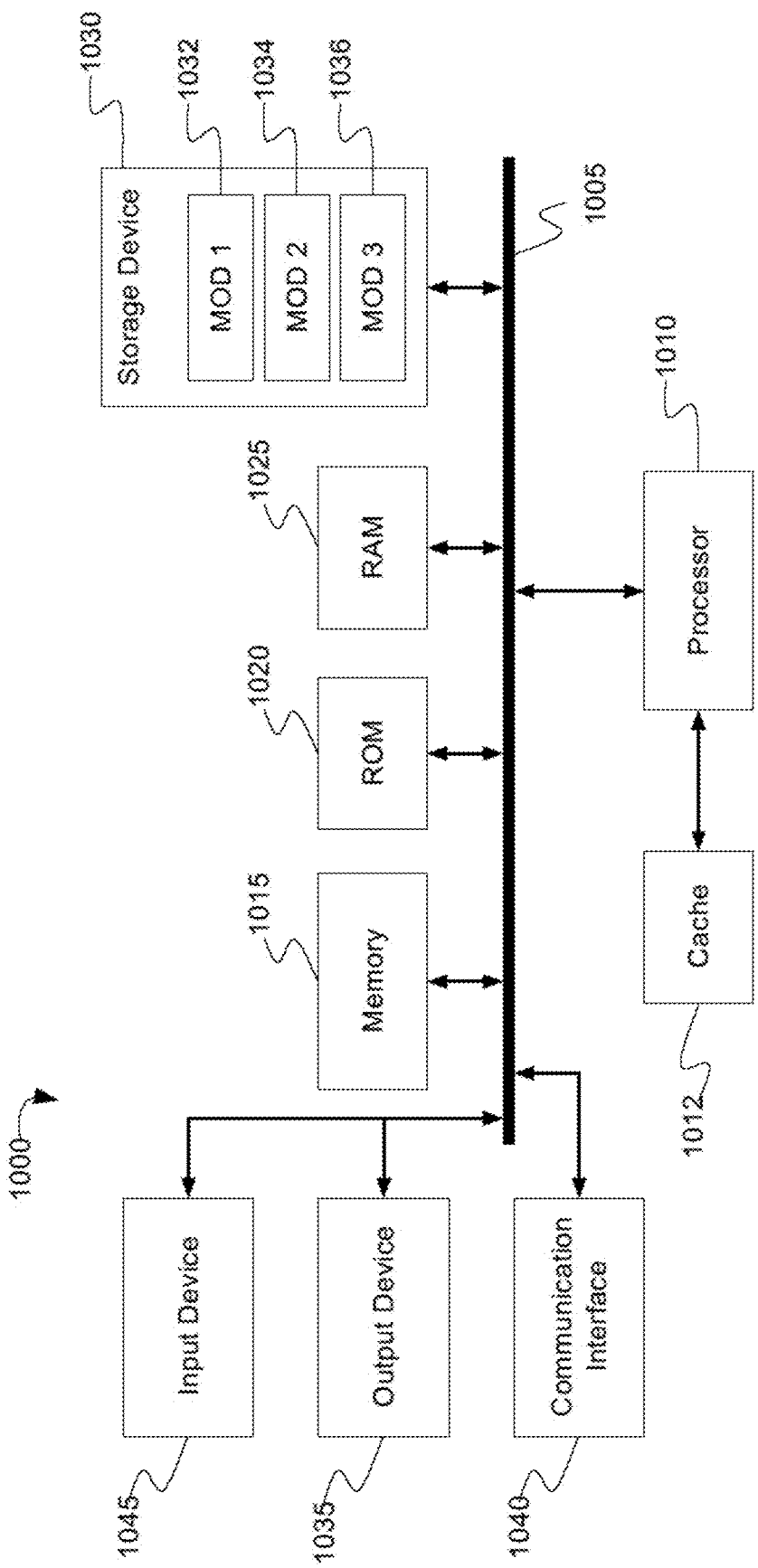
FIG. 10A shows an example system embodiment for implementing various embodiments of the present technology.
Figure 10B:
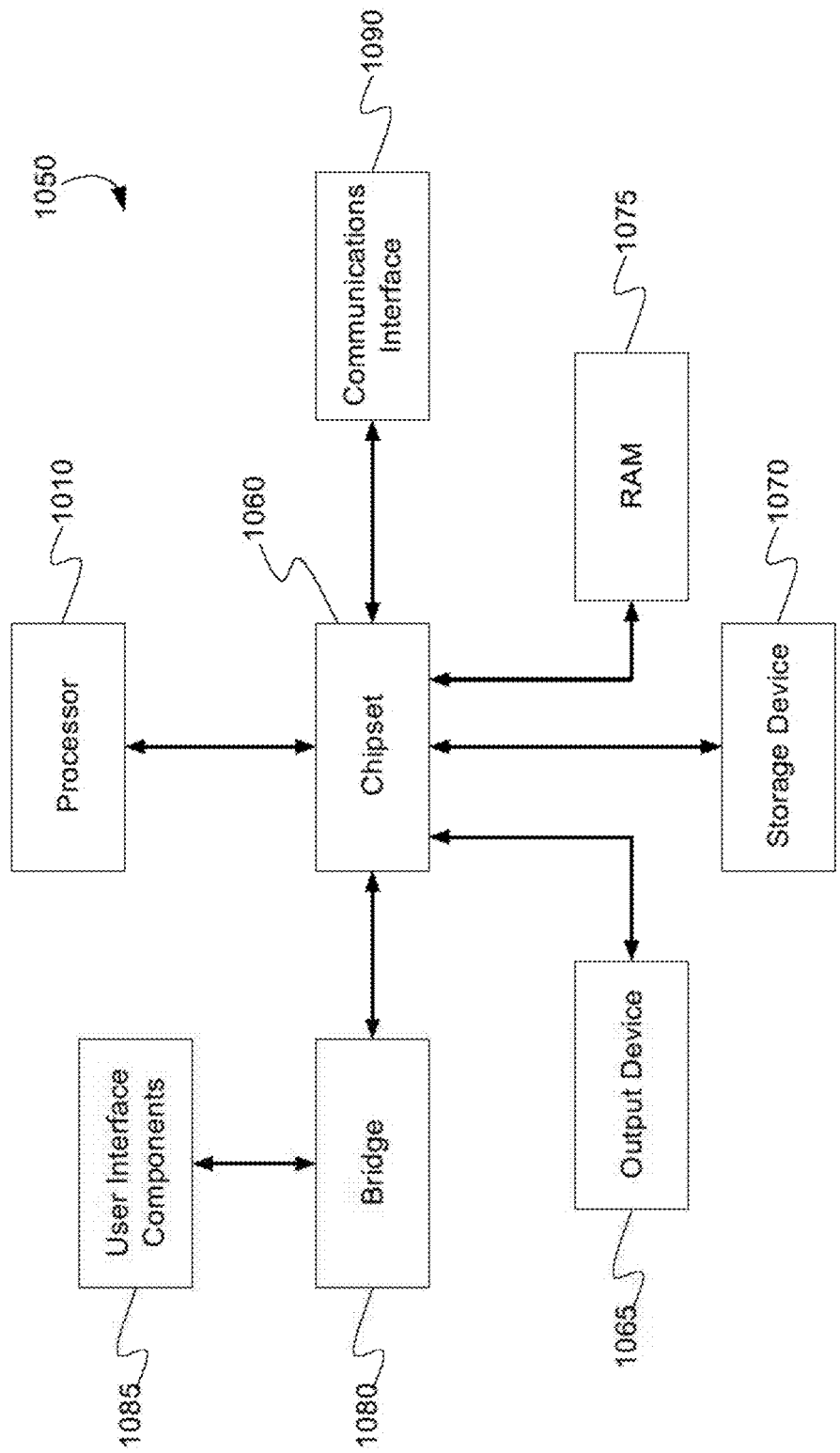
FIG. 10B shows an example system embodiment for implementing various embodiments of the present technology.

FIG. 10A and FIG. 10B show example possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Example system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1010, representative of any number of physically and/or logically distinct resources capable of executing software, firmware, and hardware configured to perform identified computations. Processor 1010 can communicate with a chipset 1060 that can control input to and output from processor 1010. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1010 analyzing data stored in storage 1070 or 1075. Further, the machine can receive inputs from a user via user interface components 1085 and execute appropriate functions, such as browsing functions by interpreting these inputs using processor 1010.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range.

Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a computing system, an electronic message thread including one or more electronic messages;
   parsing, by the computing system, the electronic message thread to determine subject, sender, recipients, and message body for each of the one or more electronic messages; and
   generating, by the computing system, a collaboration content item to be added to a content management system, the collaboration content item generated based on the electronic message thread, wherein the content management system comprises at least one existing collaboration content item and wherein the collaboration content item includes the subject, sender, and message body for each of the one or more electronic messages, wherein the collaboration content item is shared with collaborators of the content management system for presentation and editing.

2. The method of claim 1, wherein the electronic message thread is an email message thread.

3. The method of claim 1, where the collaboration content item corresponds to a first type of digital content and the one or more electronic messages correspond to a second type of digital content that is distinct from the first type of digital content.

4. The method of claim 1, wherein generating a collaboration content item based on the electronic message thread comprises:
   identifying an initial message in the electronic message thread;
   identifying a reply message in the electronic message thread;
   creating a collaboration content item based on the initial message; and
   adding a comment to the collaboration content item based on the reply message.

5. The method of claim 4, wherein adding a comment to the collaboration content item comprises:
   determining a portion of the collaboration content item corresponding to a reference in the reply message; and
   associating, in the collaboration content item, the comment with the portion of the collaboration content item corresponding to the reference in the reply message.

6. The method of claim 1, further comprising:
   identifying an initial message in the electronic message thread;
   determining a number of reply messages in the electronic message thread;
   determining that the number of reply messages exceeds a threshold number; and
   presenting a notification suggesting that collaborators associated with the initial message and reply messages schedule a meeting to discuss the electronic message thread.

7. The method of claim 1, further comprising:
   determining that a message in the message thread has been minimized; and
   automatically excluding the minimized message from the collaboration content item.

8. The method of claim 1, further comprising:
   determining that a message in the message thread includes a string included in a blacklist of strings; and
   automatically excluding the message from the collaboration content item based on the determination that the message in the message thread includes a string included in a blacklist of strings.

9. The method of claim 1, further comprising:
   automatically determining sharing permissions to assign to an identified collaborator for the collaboration content item based on whether the identified collaborator is addressed in the "from" field, "to" field, the "CC" field, or the "BCC" field of a message in the electronic message thread.

10. The method of claim 1, wherein the collaborators comprise the recipients.

11. A system comprising:
    one or more processors; and
    a non-transitory computer readable medium storing instructions that, when executed by the one or more processors, cause:
    receiving, by the system, an electronic message thread including one or more electronic messages;
    parsing, by the system, the electronic message thread to determine, for each of the one or more electronic messages, one or more of: a subject, a sender, one or more recipients, a message body, or any combination thereof; and
    generating, by the system, a collaboration content item to be added to a content management system, the collaboration content item generated based on the electronic message thread, wherein the content management system comprises at least one existing collaboration content item and wherein the collaboration content item: includes, for each of the one or more electronic messages, information corresponding to one or more of: the subject, the sender, the message body, or any combination thereof, wherein the collaboration content item is shared with collaborators of the content management system for presentation and editing.

12. The system of claim 11, wherein the one or more electronic messages are email messages.

13. The system of claim 11, where the content item corresponds to a first type of digital content and the one or more electronic messages correspond to a second type of digital content that is distinct from the first type of digital content.

14. The system of claim 11, wherein the instructions that cause generating a collaboration content item based on the electronic message thread include instructions that cause:

identifying an initial message in the electronic message thread;
identifying a reply message in the electronic message thread;
creating a collaboration content item based on the initial message; and
adding a comment to the collaboration content item based on the reply message.

15. The system of claim 14, wherein the instructions that cause adding a comment to the collaboration content item include instructions that cause:
determining a portion of the collaboration content item corresponding to a reference in the reply message; and
associating, in the collaboration content item, the comment with the portion of the collaboration content item corresponding to the reference in the reply message.

16. The system of claim 11, wherein the instructions cause:
identifying an initial message in the electronic message thread;
determining a number of reply messages in the electronic message thread;
determining that the number of reply messages exceeds a threshold number; and
presenting a notification suggesting that collaborators associated with the initial message and reply messages schedule a meeting to discuss the electronic message thread.

17. The system of claim 11, wherein the instructions cause:
determining that a message in the message thread has been minimized; and
automatically excluding the minimized message from the collaboration content item.

18. The system of claim 11, wherein the instructions cause:
determining that a message in the message thread includes a string included in a blacklist of strings; and
automatically excluding the message from the collaboration content item based on the determination that the message in the message thread includes a string included in a blacklist of strings.

19. The system of claim 11, wherein the instructions cause:
automatically determining sharing permissions to assign to an identified collaborator for the collaboration content item based on whether the identified collaborator is addressed in the "from" field, "to" field, the "CC" field, or the "BCC" field of a message in the electronic message thread.

20. A non-transitory computer-readable storage medium storing instructions that, when executed by a computing system, cause the computing system to perform operations comprising:
receiving an electronic message thread including one or more electronic messages;
parsing the electronic message thread to determine one or more attributes of the one more electronic messages;
generating a collaboration content item based on the one or more attributes of the one or more electronic messages; and
adding the generated collaboration content item to a content management system comprising at least one existing collaboration content item, wherein the collaboration content item is shared with collaborators of the content management system for presentation and editing.

21. The non-transitory computer-readable storage medium of claim 20, wherein the instructions that cause generating a collaboration content item include instructions that cause:
adding content of a particular electronic message in the electronic message thread to the collaboration content item;
determining a particular collaborator that sent the particular electronic message; and
storing metadata for the collaboration content item that attributes the content added to the collaboration content item to the particular collaborator.

22. The non-transitory computer-readable storage medium of claim 20, wherein the generated collaboration content item excludes information describing the recipients of the electronic messages.

23. The non-transitory computer-readable storage medium of claim 20, wherein the attributes include one or more of a sender, a recipient, a subject, a body, or a combination thereof.

24. The non-transitory computer-readable storage medium of claim 20, wherein the instructions cause:
determining that a message in the message thread has been minimized; and
automatically excluding the minimized message from the collaboration content item.

25. The non-transitory computer-readable storage medium of claim 20, wherein the instructions cause:
automatically determining sharing permissions to assign to an identified collaborator for the collaboration content item based on whether the identified collaborator is addressed in the "from" field, "to" field, the "CC" field, or the "BCC" field of a message in the electronic message thread.

26. The non-transitory computer-readable storage medium of claim 20, wherein the one or more electronic messages include an email message, a text message, an instant message, or a chat message.

27. A method, comprising:
receiving an electronic message thread including one or more electronic messages;
parsing the electronic message thread to determine one or more attributes of the one more electronic messages;
generating a collaboration content item based on the one or more attributes of the one or more electronic messages; and
adding the generated collaboration content item to a content management system comprising at least one existing collaboration content item, wherein the collaboration content item is shared with collaborators of the content management system for presentation and editing.

28. A system, comprising:
one or more processors; and
a non-transitory computer readable medium storing instructions that, when executed by the one or more processors, cause:
receiving an electronic message thread including one or more electronic messages;
parsing the electronic message thread to determine one or more attributes of the one more electronic messages;
generating a collaboration content item based on the one or more attributes of the one or more electronic messages; and
adding the generated collaboration content item to a content management system comprising at least one existing collaboration content item, wherein the collaboration content item is shared with collaborators of the content management system for presentation and editing.

* * * * *